(12) United States Patent
Tsunoda et al.

(10) Patent No.: US 10,569,509 B2
(45) Date of Patent: Feb. 25, 2020

(54) INTERMEDIATE FILM FOR LAMINATED GLASS HAVING COLORING MATTER WITH SPECIFIED MAXIMUM ABSORPTION WAVELENGTHS, AND LAMINATED GLASS

(71) Applicant: SEKISUI CHEMICAL CO., LTD., Osaka, Osaka (JP)

(72) Inventors: Ryuta Tsunoda, Kouka (JP); Yasuyuki Izu, Kouka (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 0 days.

(21) Appl. No.: 15/302,106

(22) PCT Filed: Apr. 7, 2015

(86) PCT No.: PCT/JP2015/060815
§ 371 (c)(1),
(2) Date: Oct. 5, 2016

(87) PCT Pub. No.: WO2015/156273
PCT Pub. Date: Oct. 15, 2015

(65) Prior Publication Data
US 2017/0113441 A1 Apr. 27, 2017

(30) Foreign Application Priority Data
Apr. 7, 2014 (JP) .................................. 2014-078813

(51) Int. Cl.
*B32B 17/10* (2006.01)
*C08J 5/18* (2006.01)
(Continued)

(52) U.S. Cl.
CPC .. *B32B 17/10651* (2013.01); *B32B 17/10036* (2013.01); *B32B 17/10678* (2013.01);
(Continued)

(58) Field of Classification Search
CPC ........... B32B 17/10036; B32B 17/1011; B32B 17/10449; B32B 17/10651;
(Continued)

(56) References Cited

U.S. PATENT DOCUMENTS 4,035,549 A * 7/1977 Kennar ............. B32B 17/10339
428/409
6,150,605 A * 11/2000 Han ..................... H01G 9/2027
136/249
(Continued)

FOREIGN PATENT DOCUMENTS

| CN | 102574740 A | 7/2012 |
| GB | 551473 A | 2/1943 |

(Continued)

OTHER PUBLICATIONS

International Search Report for the Appilcation No. PCT/JP2015/060815 dated Jul. 14, 2015.
(Continued)

*Primary Examiner* — Ryan S Dunning
(74) *Attorney, Agent, or Firm* — Cheng Law Group, PLLC

(57) ABSTRACT

There is provided an interlayer film for laminated glass enabling the laminated glass to have low transmittance for a light ray with a wavelength of 430 nm, and furthermore, being capable of achieving low excitation purity thereof. The interlayer film for laminated glass according to the present invention includes a thermoplastic resin, at least one first compound selected from yellow color-based coloring matter and red color-based coloring matter and at least one second compound selected from blue color-based coloring matter and purple color-based coloring matter, the ratio of the amount of the first compound to the amount of the second compound is 0.5 or more, and each of the blue color-based coloring matter and the purple color-based col-
(Continued)

oring matter is a kind of coloring matter with a maximum absorption wavelength of 550 nm or more and 750 nm or less.

13 Claims, 1 Drawing Sheet

(51) Int. Cl.
*C08K 5/00* (2006.01)
*G02B 5/22* (2006.01)
*G02B 5/20* (2006.01)
*G02B 5/28* (2006.01)

(52) U.S. Cl.
CPC ........... *B32B 17/10761* (2013.01); *C08J 5/18* (2013.01); *C08K 5/0008* (2013.01); *B32B 17/1011* (2013.01); *B32B 2307/4026* (2013.01); *C08J 2329/14* (2013.01); *G02B 5/208* (2013.01); *G02B 5/283* (2013.01); *G02B 5/286* (2013.01)

(58) Field of Classification Search
CPC ........ B32B 17/10678; B32B 17/10761; B32B 27/20; B32B 27/22; B32B 27/306; B32B 2250/03; B32B 2307/4026; C08J 5/18; C08J 2329/14; C08K 5/0008; G02B 1/11; G02B 1/15; G02B 5/003; G02B 5/208; G02B 5/22; G02B 5/226; G02B 5/283; G02B 5/286
USPC ....... 359/350, 359, 361, 577, 580, 589, 590, 359/614
See application file for complete search history.

(56) References Cited

U.S. PATENT DOCUMENTS

| | | | | |
|---|---|---|---|---|
| 6,811,867 | B1* | 11/2004 | McGurran | B32B 27/08 428/323 |
| 2002/0134426 | A1* | 9/2002 | Chiba | H01G 9/2031 136/263 |
| 2007/0009714 | A1* | 1/2007 | Lee | B32B 17/10568 428/172 |
| 2007/0134487 | A1 | 6/2007 | Marumoto | |
| 2012/0171479 | A1 | 7/2012 | Fukatani et al. | |
| 2013/0323515 | A1 | 12/2013 | Okabayashi et al. | |
| 2014/0335364 | A1 | 11/2014 | Fujita et al. | |
| 2015/0346404 | A1* | 12/2015 | Bak | H01L 27/14618 348/342 |

FOREIGN PATENT DOCUMENTS

| | | |
|---|---|---|
| GB | 824388 A | 11/1959 |
| JP | 54-21209 B2 | 7/1979 |
| JP | 5-84738 A | 4/1993 |
| JP | 6-191906 A | 7/1994 |
| JP | 2010-138028 A | 6/2010 |
| JP | 2012-206877 A | 10/2012 |
| JP | 2013-203574 A | 10/2013 |
| JP | 2013-216571 A | 10/2013 |
| RU | 2 415 091 C2 | 3/2011 |
| WO | WO-2011/040444 A1 | 4/2011 |
| WO | WO-2013/080859 A1 | 6/2013 |

OTHER PUBLICATIONS

International Preliminary Report on Patentability (PCT/IPEA/409) for Application No. PCT/JP2015/060815 dated Jul. 25, 2016.
Supplementary European Search Report for the Application No. EP 15 77 6558 dated Oct. 6, 2017.
Database WPI, Week 201272, Oct. 25, 2012, Thomson Scientific London, GB: AN 2012-N64823, XP002774089 (and JP 2012-206877 A).
Database WPI, Week 199318, Apr. 6, 1993, Thomson Scientific London, GB; AN 1993-148718, XP002774088 (and JP 5-84738 A).
The First Office Action for the Application No. 201580018114.1 from the State Intellectual Property Office of the People's Republic of China dated Jun. 28, 2018.
Russian Office Action for Application No. 2016143203/03(069217) dated Nov. 13, 2018.
Notification of Reasons for Refusal for the Application No. 2015-521901 from Japan Patent Office dated Apr. 9, 2019.
International Preliminary Report on Patentability (PCT/IPEA/409) for Application No. PCT/JP2015/060815 dated Jul. 25, 2016 (English Translation dated Oct. 27, 2016).

* cited by examiner

[FIG. 1]
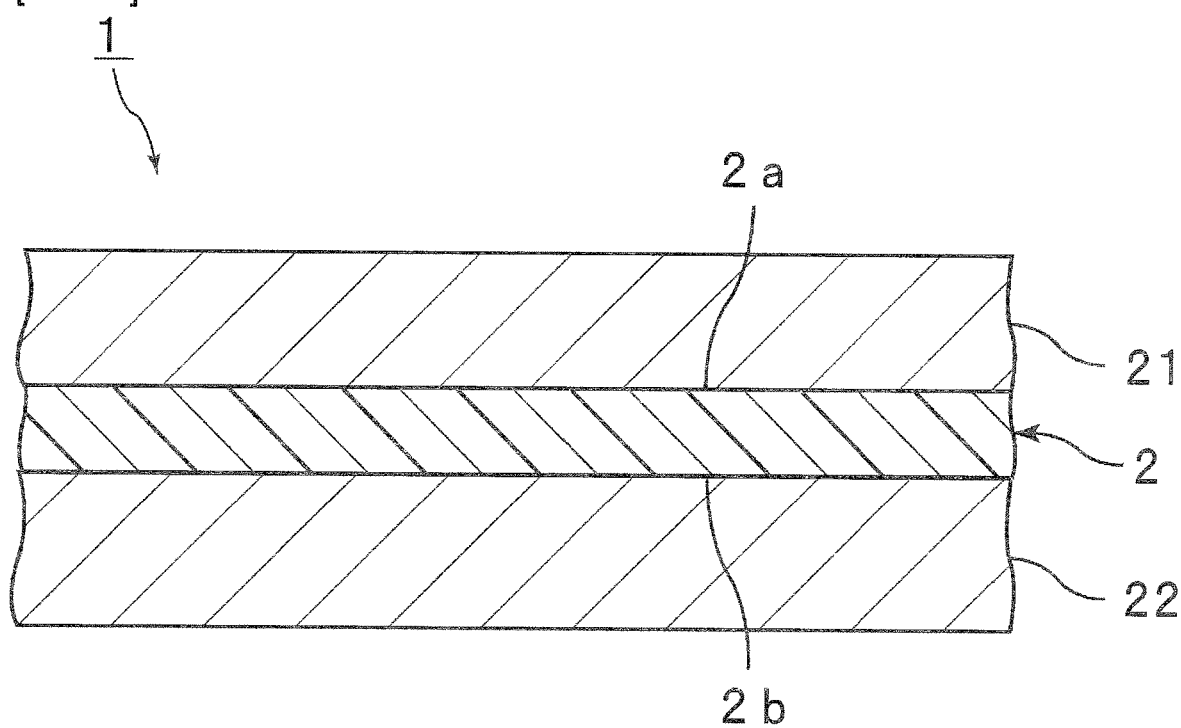
[FIG. 2]
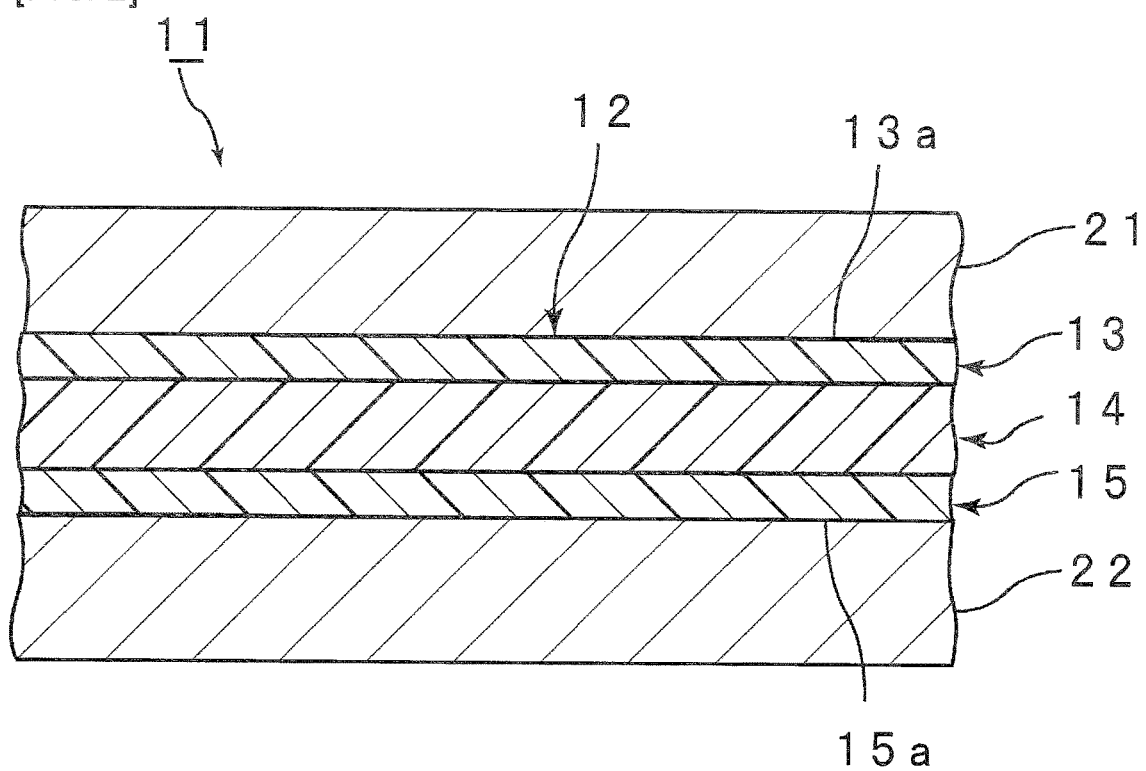

INTERMEDIATE FILM FOR LAMINATED GLASS HAVING COLORING MATTER WITH SPECIFIED MAXIMUM ABSORPTION WAVELENGTHS, AND LAMINATED GLASS

TECHNICAL FIELD

The present invention relates to an interlayer film for laminated glass which is used for obtaining laminated glass. Moreover, the present invention relates to laminated glass prepared with the interlayer film for laminated glass.

BACKGROUND ART

Since laminated glass generates only a small amount of scattering glass fragments even when subjected to external impact and broken, laminated glass is excellent in safety. As such, the laminated glass is widely used for automobiles, railway vehicles, aircraft, ships, buildings and the like. The laminated glass is produced by sandwiching an interlayer film for laminated glass between a pair of glass plates.

Moreover, laminated glass used for the opening part of vehicles and buildings is required to have high heat shielding properties.

The energy amount of an infrared ray with a wavelength of 780 nm or more which is longer than that of visible light is small as compared with an ultraviolet ray. However, the thermal action of infrared rays is large, and when infrared rays are absorbed into a substance, heat is released from the substance. As such, infrared rays are generally called heat rays. Accordingly, in order to heighten the heat shielding properties of laminated glass, it is necessary to sufficiently cut off infrared rays.

As an interlayer film including heat shielding particles for effectively cutting off the infrared rays (heat rays), the following Patent Document 1 discloses an interlayer film including a compound having a heat ray shielding function, a wavelength selective absorbing material, a polyvinyl acetal resin and a plasticizer. The compound having a heat ray shielding function is constituted of one or more kinds selected from indium tin oxide fine particles and antimony tin oxide fine particles. The wavelength selective absorbing material has a transmission profile in which the transmittance for light with a wavelength of 550 nm is 90% or more and the transmittance for light with a wavelength of 450 nm is 40% or less.

With regard to an automobile provided with laminated glass, even when a driver of the automobile does not directly view light from a headlight of an oncoming car, the driver has a psychologically unpleasant feeling due to the light passing through the laminated glass. Moreover, the visual acuity of a driver is temporarily lowered when the driver directly views light from a headlight of an oncoming car, and this may adversely affect the driving operations. In view of such problems, the enhancement in the antiglare property of laminated glass has been strongly desired. An interlayer film in which a pigment, a dye, a coloring agent or the like as a material having visible light absorbing properties is used in order to enhance the antiglare property has been known. For example, the following Patent Document 2 discloses an interlayer film including a tetraazaporphyrin compound.

RELATED ART DOCUMENT

Patent Document

Patent Document 1: JP 2013-203574 A
Patent Document 2: JP 2010-138028 A

SUMMARY OF THE INVENTION

Problems to be Solved by the Invention

In recent years, while applications required for laminated glass are diversified, laminated glass excellent in decorativeness has been desired depending on applications. However, in sheets of laminated glass prepared with conventional interlayer films such as those described in Patent Document 1 and Patent Document 2, there are cases where the decorativeness is lowered because the sheet is high in excitation purity.

Moreover, a light ray with a wavelength near 430 nm which is close to the ultraviolet ray harmfully affects the photoreceptor cells. Accordingly, it is desirable for the interlayer film to be low in transmittance for a light ray with a wavelength of 430 nm. However, there are cases where a sheet of laminated glass prepared with a conventional interlayer film is high in transmittance for a light ray with a wavelength of 430 nm. Even if the sheet of laminated glass prepared with a conventional interlayer film is made to have low light transmittance at a wavelength of 430 nm, the excitation purity is heightened and there are cases where the decorativeness is lowered.

As described above, in a sheet of laminated glass prepared with a conventional interlayer film, it is difficult to satisfy both requirements of being low in transmittance for a light ray with a wavelength of 430 nm and being low in excitation purity.

An object of the present invention is to provide an interlayer film for laminated glass enabling the laminated glass to have low transmittance for a light ray with a wavelength of 430 nm, and furthermore, being capable of achieving low excitation purity thereof. Moreover, the present invention is also aimed at providing laminated glass prepared with the above-mentioned interlayer film for laminated glass.

Means for Solving the Problems

According to a broad aspect of the present invention, there is provided an interlayer film for laminated glass including a thermoplastic resin, at least one first compound selected from yellow color-based coloring matter and red color-based coloring matter and at least one second compound selected from blue color-based coloring matter and purple color-based coloring matter, the ratio of the amount of the first compound to the amount of the second compound being 0.5 or more, and each of the blue color-based coloring matter and the purple color-based coloring matter being a kind of coloring matter with a maximum absorption wavelength of 550 nm or more and 750 nm or less.

In a specific aspect of the interlayer film for laminated glass according to the present invention, the first compound is constituted of at least one kind selected from the group consisting of a quinophthalone compound with a maximum absorption wavelength of 300 nm or more and 550 nm or less, a perylene compound with a maximum absorption wavelength of 300 nm or more and 550 nm or less and an isoindolinone compound with a maximum absorption wavelength of 300 nm or more and 550 nm or less, and the second compound is constituted of at least one kind selected from the group consisting of a phthalocyanine compound with a maximum absorption wavelength of 550 nm or more and 750 nm or less, a naphthalocyanine compound with a maximum absorption wavelength of 550 nm or more and 750 nm or less and a tetraazaporphyrin compound with a maximum absorption wavelength of 550 nm or more and 750 nm or less.

It is preferred that the thermoplastic resin be a polyvinyl acetal resin. It is preferred that the interlayer film include a plasticizer.

In a specific aspect of the interlayer film for laminated glass according to the present invention, the ratio of the amount of the first compound to the amount of the second compound is preferably 1.0 or more and preferably 5.0 or less.

It is preferred that the interlayer film include an ultraviolet ray screening agent. It is preferred that the interlayer film include an oxidation inhibitor.

According to a broad aspect of the present invention, there is provided laminated glass including a first laminated glass member, a second laminated glass member and an interlayer film for laminated glass described above, the interlayer film for laminated glass being arranged between the first laminated glass member and the second laminated glass member.

Effect of the Invention

Since the interlayer film for laminated glass according to the present invention includes a thermoplastic resin, at least one first compound selected from yellow color-based coloring matter and red color-based coloring matter and at least one second compound selected from blue color-based coloring matter and purple color-based coloring matter, furthermore, the ratio of the amount of the first compound to the amount of the second compound is 0.5 or more, and each of the blue color-based coloring matter and the purple color-based coloring matter is a kind of coloring matter with a maximum absorption wavelength of 550 nm or more and 750 nm or less, the laminated glass can be made to have low transmittance for a light ray with a wavelength of 430 nm, and furthermore, low excitation purity thereof can be achieved.

BRIEF DESCRIPTION OF DRAWINGS

FIG. 1 is a partially cut-away sectional view showing laminated glass prepared with an interlayer film for laminated glass in accordance with one embodiment of the present invention.

FIG. 2 is a partially cut-away sectional view showing a modified example of laminated glass prepared with an interlayer film for laminated glass in accordance with one embodiment of the present invention.

MODE(S) FOR CARRYING OUT THE INVENTION

Hereinafter, the details of the present invention will be described.

The interlayer film for laminated glass (hereinafter, sometimes abbreviated as the interlayer film) according to the present invention includes a thermoplastic resin, at least one first compound selected from yellow color-based coloring matter and red color-based coloring matter and at least one second compound selected from blue color-based coloring matter and purple color-based coloring matter. Furthermore, in the present invention, each of the blue color-based coloring matter and the purple color-based coloring matter is a kind of coloring matter with a maximum absorption wavelength of 550 nm or more and 750 nm or less. In the present invention, the above-mentioned specific first compound and the above-mentioned specific second compound are used in combination. Furthermore, in the present invention, the ratio of the amount of the first compound to the amount of the second compound (the amount of the first compound/the amount of the second compound) is 0.5 or more.

In the present invention, since the interlayer film for laminated glass is provided with the above-mentioned configuration, the laminated glass can be made to have low transmittance for a light ray with a wavelength of 430 nm, and furthermore, low excitation purity thereof can be achieved. It has been found by the present inventors that, by combinedly using a thermoplastic resin, the first compound and the second compound and making the ratio (the amount of the first compound/the amount of the second compound) 0.5 or more, the laminated glass can be made to have low transmittance for a light ray with a wavelength of 430 nm, and furthermore, low excitation purity thereof can be achieved. Moreover, not only by combinedly using a thermoplastic resin, the first compound and the second compound, but also by making the ratio (the amount of the first compound/the amount of the second compound) 0.5 or more, as compared to the case where the ratio (the amount of the first compound/the amount of the second compound) is less than 0.5, it is possible to effectively lower the transmittance for a light ray with a wavelength of 430 nm and the excitation purity.

From the viewpoints of effectively lowering the transmittance for a light ray with a wavelength of 430 nm and furthermore achieving both low transmittance for the light ray and low excitation purity with good balance, the ratio (the amount of the first compound/the amount of the second compound) is preferably 1.0 or more, preferably 50 or less, more preferably 25 or more and further preferably 5.0 or less.

Hereinafter, respective materials which can be used for the interlayer film according to the present invention will be described in detail.

(Thermoplastic Resin)

A thermoplastic resin included in the interlayer film is not particularly limited. It is possible to use a conventionally known thermoplastic resin as the thermoplastic resin. One kind of the thermoplastic resin may be used alone, and two or more kinds thereof may be combinedly used.

Examples of the thermoplastic resin include a polyvinyl acetal resin, an ethylene-vinyl acetate copolymer resin, an ethylene-acrylic acid copolymer resin, a polyurethane resin, a polyvinyl alcohol resin, and the like. Thermoplastic resins other than these may be used.

It is preferred that the thermoplastic resin be a polyvinyl acetal resin. By using a polyvinyl acetal resin and a plasticizer together, the adhesive force of the interlayer film according to the present invention to a laminated glass member or another interlayer film is further heightened.

For example, the polyvinyl acetal resin can be produced by acetalizing polyvinyl alcohol with an aldehyde. For example, the polyvinyl alcohol can be produced by saponifying polyvinyl acetate. The saponification degree of the polyvinyl alcohol generally lies within the range of 70 to 99.9% by mole.

The average polymerization degree of the polyvinyl alcohol is preferably 200 or more, more preferably 500 or more, preferably 3500 or less, more preferably 3000 or less and further preferably 2500 or less. When the average polymerization degree is the above lower limit or more, the penetration resistance of laminated glass is further enhanced. When the average polymerization degree is the above upper limit or less, formation of an interlayer film is facilitated.

The average polymerization degree of the polyvinyl alcohol is determined by a method in accordance with JIS K6726 "Testing methods for polyvinyl alcohol".

The number of carbon atoms of the acetal group contained in the polyvinyl acetal resin is not particularly limited. The aldehyde used at the time of producing the polyvinyl acetal resin is not particularly limited. It is preferred that the number of carbon atoms of the acetal group in the polyvinyl acetal resin be 3 or 4. When the number of carbon atoms of the acetal group in the polyvinyl acetal resin is 3 or more, the glass transition temperature of the interlayer film is sufficiently lowered.

The aldehyde is not particularly limited. In general, as the aldehyde, an aldehyde with 1 to 10 carbon atoms is suitably used. Examples of the aldehyde with 1 to 10 carbon atoms include propionaldehyde, n-butyraldehyde, isobutyraldehyde, n-valeraldehyde, 2-ethylbutyraldehyde, n-hexylaldehyde, n-octylaldehyde, n-nonylaldehyde, n-decylaldehyde, formaldehyde, acetaldehyde, benzaldehyde, and the like. Of these, propionaldehyde, n-butyraldehyde, isobutyraldehyde, n-hexylaldehyde or n-valeraldehyde is preferred, propionaldehyde, n-butyraldehyde or isobutyraldehyde is more preferred, and n-butyraldehyde is further preferred. One kind of the aldehyde may be used alone, and two or more kinds thereof may be combinedly used.

The content of the hydroxyl group (the amount of hydroxyl groups) of the polyvinyl acetal resin is preferably 15% by mole or more, more preferably 18% by mole or more, preferably 40% by mole or less and more preferably 35% by mole or less. When the content of the hydroxyl group is the above lower limit or more, the adhesive force of the interlayer film is further heightened. Moreover, when the content of the hydroxyl group is the above upper limit or less, the flexibility of the interlayer film is enhanced and the handling of the interlayer film is facilitated.

The content of the hydroxyl group of the polyvinyl acetal resin is a mole fraction, represented in percentage, obtained by dividing the amount of ethylene groups to which the hydroxyl group is bonded by the total amount of ethylene groups in the main chain. For example, the amount of ethylene groups to which the hydroxyl group is bonded can be measured in accordance with JIS K6726 "Testing methods for polyvinyl alcohol" or in accordance with ASTM D1396-92 to be determined.

The acetylation degree (the amount of acetyl groups) of the polyvinyl acetal resin is preferably 0.1% by mole or more, more preferably 0.3% by mole or more, further preferably 0.5% by mole or more, preferably 30% by mole or less, more preferably 25% by mole or less and further preferably 20% by mole or less. When the acetylation degree is the above lower limit or more, the compatibility between the polyvinyl acetal resin and a plasticizer is heightened. When the acetylation degree is the above upper limit or less, with regard to the interlayer film and laminated glass, the moisture resistance thereof is enhanced.

The acetylation degree is a mole fraction, represented in percentage, obtained by dividing a value obtained by subtracting the amount of ethylene groups to which the acetal group is bonded and the amount of ethylene groups to which the hydroxyl group is bonded from the total amount of ethylene groups in the main chain by the total amount of ethylene groups in the main chain. For example, the amount of ethylene groups to which the acetal group is bonded can be measured in accordance with JIS K6728 "Testing methods for polyvinyl butyral" or in accordance with ASTM D1396-92.

The acetalization degree of the polyvinyl acetal resin (the butyralization degree in the case of a polyvinyl butyral resin) is preferably 60% by mole or more, more preferably 63% by mole or more, preferably 85% by mole or less, more preferably 75% by mole or less and further preferably 70% by mole or less. When the acetalization degree is the above lower limit or more, the compatibility between the polyvinyl acetal resin and a plasticizer is heightened. When the acetalization degree is the above upper limit or less, the reaction time required for producing the polyvinyl acetal resin is shortened.

The acetalization degree is a mole fraction, represented in percentage, obtained by dividing the amount of ethylene groups to which the acetal group is bonded by the total amount of ethylene groups in the main chain.

The acetalization degree can be calculated by measuring the acetylation degree and the content of the hydroxyl group by a method in accordance with JIS K6728 "Testing methods for polyvinyl butyral" or a method in accordance with ASTM D1396-92, calculating the mole fraction from the measurement results obtained, and then subtracting the acetylation degree and the content of the hydroxyl group from 100% by mole.

In this connection, it is preferred that the content of the hydroxyl group (the amount of hydroxyl groups), the acetalization degree (the butyralization degree) and the acetylation degree be calculated from the results measured by a method in accordance with JIS K6728 "Testing methods for polyvinyl butyral". When the polyvinyl acetal resin is a polyvinyl butyral resin, it is preferred that the content of the hydroxyl group (the amount of hydroxyl groups), the acetalization degree (the butyralization degree) and the acetylation degree be calculated from the results measured by a method in accordance with JIS K6728 "Testing methods for polyvinyl butyral".

(Plasticizer)

From the viewpoint of further heightening the adhesive force of an interlayer film, it is preferred that the interlayer film according to the present invention include a plasticizer. When the thermoplastic resin included in an interlayer film is a polyvinyl acetal resin, it is especially preferred that the interlayer film include a plasticizer.

The plasticizer is not particularly limited. As the plasticizer, a conventionally known plasticizer can be used. One kind of the plasticizer may be used alone, and two or more kinds thereof may be combinedly used.

Examples of the plasticizer include organic ester plasticizers such as a monobasic organic acid ester and a polybasic organic acid ester, organic phosphate plasticizers such as an organic phosphate plasticizer and an organic phosphite plasticizer, and the like. Of these, organic ester plasticizers are preferred. It is preferred that the plasticizer be a liquid plasticizer.

The monobasic organic acid ester is not particularly limited, and examples thereof include a glycol ester obtained by the reaction of a glycol and a monobasic organic acid, an ester of triethylene glycol or tripropylene glycol with a monobasic organic acid, and the like. Examples of the glycol include triethylene glycol, tetraethylene glycol, tripropylene glycol, and the like. Examples of the monobasic organic acid include butyric acid, isobutyric acid, caproic acid, 2-ethylbutyric acid, hepthylic acid, n-octylic acid, 2-ethylhexanoic acid, n-nonylic acid, decylic acid, and the like.

The polybasic organic acid ester is not particularly limited and examples thereof include an ester compound of a polybasic organic acid and an alcohol having a linear or branched structure of 4 to 8 carbon atoms. Examples of the polybasic organic acid include adipic acid, sebacic acid, azelaic acid, and the like.

The organic ester plasticizer is not particularly limited and examples thereof include triethylene glycol di-2-ethylbutyrate, triethylene glycol di-2-ethylhexanoate, triethylene glycol dicaprylate, triethylene glycol di-n-octanoate, triethylene glycol di-n-heptanoate, tetraethylene glycol di-n-heptanoate, dibutyl sebacate, dioctyl azelate, dibutyl carbitol adipate, ethylene glycol di-2-ethylbutyrate, 1,3-propylene glycol di-2-ethylbutyrate, 1,4-butylene glycol di-2-ethylbutyrate, diethylene glycol di-2-ethylbutyrate, diethylene glycol di-2-ethylhexanoate, dipropylene glycol di-2-ethylbutyrate, triethylene glycol di-2-ethylpentanoate, tetraethylene glycol di-2-ethylbutyrate, diethylene glycol dicapryate, dihexyl adipate, dioctyl adipate, hexyl cyclohexyl adipate, a mixture of heptyl adipate and nonyl adipate, diisononyl adipate, diisodecyl adipate, heptyl nonyl adipate, dibutyl sebacate, oil-modified sebacic alkyds, a mixture of a phosphoric acid ester and an adipic acid ester, and the like. Organic ester plasticizers other than these may be used.

The organic phosphate plasticizer is not particularly limited and examples thereof include tributoxyethyl phosphate, isodecyl phenyl phosphate, triisopropyl phosphate, and the like.

It is preferred that the plasticizer be a diester plasticizer represented by the following formula (1).

[Chemical 1]

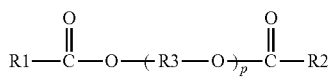

Formula (1)

In the foregoing formula (1), R1 and R2 each represent an organic group with 5 to 10 carbon atoms, R3 represents an ethylene group, an isopropylene group or an n-propylene group, and p represents an integer of 3 to 10. It is preferred that R1 and R2 in the foregoing formula (1) each be an organic group with 6 to 10 carbon atoms.

It is preferred that the plasticizer include triethylene glycol di-2-ethylhexanoate (3GO) or triethylene glycol di-2-ethylbutyrate, and it is more preferred that the plasticizer include triethylene glycol di-2-ethylhexanoate.

The amount of the plasticizer is not particularly limited. The amount of the plasticizer is preferably 25 parts by weight or more, more preferably 30 parts by weight or more, preferably 60 parts by weight or less and more preferably 50 parts by weight or less, relative to 100 parts by weight of the thermoplastic resin. When the amount of the plasticizer is the above lower limit or more, the penetration resistance of laminated glass is further enhanced. When the amount of the plasticizer is the above upper limit or less, the transparency of the interlayer film is further enhanced.

(First Compound)

The first compound is constituted of at least one kind selected from yellow color-based coloring matter and red color-based coloring matter. It is preferred that each of the yellow color-based coloring matter and the red color-based coloring matter be a kind of coloring matter with a maximum absorption wavelength of 300 nm or more and 550 nm or less. It is preferred that the coloring matter with a maximum absorption wavelength of 300 nm or more and 550 nm or less be constituted of at least one kind selected from the group consisting of a quinophthalone compound with a maximum absorption wavelength of 300 nm or more and 550 nm or less, a perylene compound with a maximum absorption wavelength of 300 nm or more and 550 nm or less and an isoindolinone compound with a maximum absorption wavelength of 300 nm or more and 550 nm or less. As the first compound, the interlayer film may include the quinophthalone compound, may include the perylene compound and may include the isoindolinone compound. As the first compound, the interlayer film may include at least one kind among the quinophthalone compound and the perylene compound. One kind of the first compound may be used alone, and two or more kinds thereof may be combinedly used.

For example, the maximum absorption wavelength of each of the first compound and the second compound according to the present invention can be measured by the following method. With 100 parts by weight of chloroform, 0.002 parts by weight of a first compound or a second compound is mixed to obtain a chloroform solution. The resulting chloroform solution is placed in a quartz cell for a spectrophotometer with an optical path length of 1.0 mm. Using a self-registering spectrophotometer ("U4100" available from Hitachi, Ltd.), the transmittance in the wavelength range of 300 to 2500 nm is measured to determine the maximum absorption wavelength. In this connection, in the present specification, in the case of the first compound, the maximum absorption wavelength refers to the wavelength at which the transmittance in the wavelength range of 300 to 550 nm shows a minimum value and the minimum value is the smallest, that is the maximal absorption wavelength, and in the case of the second compound, the maximum absorption wavelength refers to the wavelength at which the transmittance in the wavelength range of 300 to 2500 nm shows a minimum value and the minimum value is the smallest, that is the maximal absorption wavelength.

Examples of the quinophthalone compound include quinophthalone and a derivative of quinophthalone. It is preferred that each of the quinophthalone compound and the derivative of quinophthalone have a quinophthalone skeleton. Examples of the perylene compound include perylene and a derivative of perylene. It is preferred that each of the perylene compound and the derivative of perylene have a perylene skeleton. Examples of the isoindolinone compound include isoindolinone and a derivative of isoindolinone. It is preferred that each of the isoindolinone compound and the derivative of isoindolinone have an isoindolinone skeleton.

In 100% by weight of the interlayer film, the amount (the whole amount) of the first compound is preferably 0.0003% by weight or more, more preferably 0.003% by weight or more, preferably 0.5% by weight or less and more preferably 0.05% by weight or less. Moreover, in 100% by weight of the interlayer film, each of the amount of the quinophthalone compound, the amount of the perylene compound and the amount of the isoindolinone compound is preferably 0.0003% by weight or more, more preferably 0.0006% by weight or more, further preferably 0.003% by weight or more, especially preferably 0.006% by weight or more, preferably 0.5% by weight or less, more preferably 0.4% by weight or less, further preferably 0.05% by weight or less and especially preferably 0.04% by weight or less. When each of these amounts is the above lower limit or more and the above upper limit or less, it is possible to effectively lower the transmittance for a light ray with a wavelength of 430 nm, and furthermore, to achieve both low transmittance for the light ray and low excitation purity with good balance.

(Second Compound)

The second compound is constituted of at least one kind selected from blue color-based coloring matter and purple color-based coloring matter. Each of the blue color-based coloring matter and the purple color-based coloring matter is a kind of coloring matter with a maximum absorption wavelength of 550 nm or more and 750 nm or less. It is preferred that the coloring matter with a maximum absorption wavelength of 550 nm or more and 750 nm or less be constituted of at least one kind selected from the group consisting of a phthalocyanine compound with a maximum absorption wavelength of 550 nm or more and 750 nm or less, a naphthalocyanine compound with a maximum absorption wavelength of 550 nm or more and 750 nm or less and a tetraazaporphyrin compound with a maximum absorption wavelength of 550 nm or more and 750 nm or less. As the second compound, the interlayer film may include the phthalocyanine compound, may include the naphthalocyanine compound and may include the tetraazaporphyrin compound. As the second compound, the interlayer film may include at least one kind among the phthalocyanine compound and the tetraazaporphyrin compound. One kind of the second compound may be used alone, and two or more kinds thereof may be combinedly used.

Moreover, as the second compound, the interlayer film may include at least one kind among a phthalocyanine compound and a naphthalocyanine compound.

Examples of the phthalocyanine compound include phthalocyanine and a derivative of phthalocyanine. Examples of the naphthalocyanine compound include naphthalocyanine and a derivative of naphthalocyanine. It is preferred that each of the phthalocyanine compound and the derivative of phthalocyanine have a phthalocyanine skeleton. It is preferred that each of the naphthalocyanine compound and the derivative of naphthalocyanine have a naphthalocyanine skeleton.

It is preferred that each of the phthalocyanine compound and the naphthalocyanine compound contain a vanadium atom or a copper atom, and it is more preferred that each of the phthalocyanine compound and the naphthalocyanine compound contain a copper atom. Each of the phthalocyanine compound and the naphthalocyanine compound may contain a vanadium atom. It is preferred that the phthalocyanine compound be constituted of at least one kind among phthalocyanine containing a vanadium atom or a copper atom and a derivative of phthalocyanine containing a vanadium atom or a copper atom, and it is more preferred that the phthalocyanine compound be constituted of at least one kind among phthalocyanine containing a copper atom and a derivative of phthalocyanine containing a copper atom. With regard to the interlayer film and laminated glass, from the viewpoint of still further heightening the heat shielding properties thereof, it is preferred that each of the phthalocyanine compound and the naphthalocyanine compound have a structural unit in which an oxygen atom is bonded to a copper atom.

Examples of the tetraazaporphyrin compound include tetraazaporphyrin and a derivative of tetraazaporphyrin. It is preferred that each of the tetraazaporphyrin compound and the derivative of tetraazaporphyrin have a tetraazaporphyrin skeleton.

In 100% by weight of the interlayer film, the amount (the whole amount) of the second compound is preferably 0.0001% by weight or more, more preferably 0.001% by weight or more, preferably 1.0% by weight or less and more preferably 0.1% by weight or less. Moreover, in 100% by weight of the interlayer film, each of the amount of the phthalocyanine compound, the amount of the naphthalocyanine compound and the amount of the tetraazaporphyrin compound is preferably 0.0001% by weight or more, more preferably 0.001% by weight or more, preferably 1.0% by weight or less and more preferably 0.1% by weight or less. Moreover, the amount (the whole amount) of at least one kind among the phthalocyanine compound and the naphthalocyanine compound is preferably 0.0001% by weight or more, more preferably 0.001% by weight or more, preferably 1.0% by weight or less and more preferably 0.1% by weight or less, respectively. When each of these amounts is the above lower limit or more and the above upper limit or less, it is possible to effectively lower the transmittance for a light ray with a wavelength of 430 nm, and furthermore, to achieve both low transmittance for the light ray and low excitation purity with good balance.

In 100% by weight of the interlayer film, the total amount of the first compound and the second compound is preferably 0.001% by weight or more, more preferably 0.005% by weight or more, even more preferably 0.01% by weight or more, further preferably 0.02% by weight or more, still further preferably 0.03% by weight or more and especially preferably 0.04% by weight or more. When the total amount of the first compound and the second compound is the above preferred lower limit or more, it is possible to further lower the transmittance for a light ray with a wavelength of 430 nm. In 100% by weight of the interlayer film, the total amount of the first compound and the second compound is preferably 5% by weight or less, more preferably 1% by weight or less, even more preferably 0.1% by weight or less, further preferably 0.05% by weight or less, still further preferably 0.04% by weight or less, especially preferably 0.026% by weight or less and most preferably 0.02% by weight or less. When the total amount of the first compound and the second compound is the above preferred upper limit or less, it is possible to further lower the excitation purity.

(Ultraviolet Ray Screening Agent)

It is preferred that the interlayer film include an ultraviolet ray screening agent. By the use of an ultraviolet ray screening agent, even when the interlayer film and the laminated glass are used for a long period of time, the visible light transmittance becomes further difficult to be lowered. In this connection, for example, the visible light transmittance refers to visible light transmittance within a range of 380 to 780 nm, and it is desirable that the visible light transmittance within the whole range be high. One kind of the ultraviolet ray screening agent may be used alone, and two or more kinds thereof may be combinedly used.

Examples of the ultraviolet ray screening agent include an ultraviolet ray absorber. It is preferred that the ultraviolet ray screening agent be an ultraviolet ray absorber.

Examples of the ultraviolet ray screening agent include a metal-based ultraviolet ray screening agent, a metal oxide-based ultraviolet ray screening agent, a benzotriazole-based ultraviolet ray screening agent, a benzophenone-based ultraviolet ray screening agent, a triazine-based ultraviolet ray screening agent, a malonic acid ester-based ultraviolet ray screening agent, an oxanilide-based ultraviolet ray screening agent, a benzoate-based ultraviolet ray screening agent, and the like.

Examples of the metal-based ultraviolet ray absorber include platinum particles, particles in which the surface of platinum particles is coated with silica, palladium particles, particles in which the surface of palladium particles is coated with silica, and the like. It is preferred that the ultraviolet ray screening agent not be heat shielding particles.

The ultraviolet ray screening agent is preferably a benzotriazole-based ultraviolet ray screening agent, a benzophenone-based ultraviolet ray screening agent, a triazine-based ultraviolet ray screening agent or a benzoate-based ultraviolet ray screening agent, more preferably a benzotriazole-based ultraviolet ray screening agent or a benzophenone-based ultraviolet ray screening agent, and further preferably a benzotriazole-based ultraviolet ray absorber.

Examples of the metal oxide-based ultraviolet ray absorber include zinc oxide, titanium oxide, cerium oxide, and the like. Furthermore, with regard to the metal oxide-based ultraviolet ray absorber, the surface thereof may be coated with any material. Examples of the coating material for the surface of the metal oxide-based ultraviolet ray absorber include an insulating metal oxide, a hydrolyzable organosilicon compound, a silicone compound, and the like.

Examples of the insulating metal oxide include silica, alumina, zirconia and the like. For example, the insulating metal oxide has a band-gap energy of 5.0 eV or more.

Examples of the benzotriazole-based ultraviolet ray absorber include benzotriazole-based ultraviolet ray absorbers such as 2-(2'-hydroxy-5'-methylphenyl)benzotriazole ("Tinuvin P" available from BASF Japan Ltd.), 2-(2'-hydroxy-3',5'-di-t-butylphenyl)benzotriazole ("Tinuvin 320" available from BASF Japan Ltd.), 2-(2'-hydroxy-3'-t-butyl-5-methylphenyl)-5-chlorobenzotriazole ("Tinuvin 326" available from BASF Japan Ltd.) and 2-(2'-hydroxy-3',5'-di-amylphenyl)benzotriazole ("Tinuvin 328" available from BASF Japan Ltd.). It is preferred that the ultraviolet ray screening agent be a benzotriazole-based ultraviolet ray absorber containing halogen atoms, and it is more preferred that the ultraviolet ray screening agent be a benzotriazole-based ultraviolet ray absorber containing chlorine atoms, since those are excellent in ultraviolet ray absorbing performance.

Examples of the benzophenone-based ultraviolet ray absorber include octabenzone ("Chimassorb 81" available from BASF Japan Ltd.), and the like.

Examples of the triazine-based ultraviolet ray absorber include "LA-F70" available from ADEKA CORPORATION, 2-(4,6-diphenyl-1,3,5-triazine-2-yl)-5-[(hexyl)oxy]-phenol ("Tinuvin 1577FF" available from BASF Japan Ltd.), and the like.

Examples of the malonic acid ester-based ultraviolet ray screening agent include dimethyl 2-(p-methoxybenzylidene)malonate, tetraethyl-2,2-(1,4-phenylenedimethylidyne)bis-malonate, 2-(p-methoxybenzylidene)-bis(1,2,2,6,6-pentamethyl-4-piperidinyl)malonate, and the like.

Examples of a commercial product of the malonic acid ester-based ultraviolet ray screening agent include Hostavin B-CAP, Hostavin PR-25 and Hostavin PR-31 (any of these is available from Clariant Japan K.K.).

Examples of the oxanilide-based ultraviolet ray screening agent include a kind of oxalic acid diamide having a substituted aryl group and the like on the nitrogen atom such as N-(2-ethylphenyl)-N'-(2-ethoxy-5-t-butylphenyl)oxalic acid diamide, N-(2-ethylphenyl)-N'-(2-ethoxy-phenyl)oxalic acid diamide and 2-ethyl-2'-ethoxy-oxanilide ("Sanduvor VSU" available from Clariant Japan K.K.).

Examples of the benzoate-based ultraviolet ray absorber include 2,4-di-tert-butylphenyl-3,5-di-tert-butyl-4-hydroxybenzoate ("Tinuvin 120" available from BASF Japan Ltd.), and the like.

The amount of the ultraviolet ray screening agent in the interlayer film is not particularly limited. From the viewpoint of further suppressing the lowering in visible light transmittance after the lapse of a certain period of time, in 100% by weight of the interlayer film, the amount of the ultraviolet ray screening agent is preferably 0.07% by weight or more, more preferably 0.14% by weight or more, further preferably 0.2% by weight or more, especially preferably 0.35% by weight or more, preferably 1.6% by weight or less, more preferably 1.3% by weight or less, further preferably 0.7% by weight or less and especially preferably 0.6% by weight or less. In particular, by setting the amount of the ultraviolet ray screening agent to be 0.14% by weight or more in 100% by weight of the interlayer film, with regard to the interlayer film and laminated glass, the lowering in visible light transmittance thereof after the lapse of a certain period of time can be significantly suppressed. Similarly, from the viewpoint of further suppressing the lowering in visible light transmittance after the lapse of a certain period of time, relative to 100 parts by weight of the thermoplastic resin, the amount of the ultraviolet ray screening agent is preferably 0.1 part by weight or more, more preferably 0.2 parts by weight or more, further preferably 0.3 parts by weight or more, especially preferably 0.5 parts by weight or more, preferably 2.5 parts by weight or less, more preferably 2 parts by weight or less, further preferably 1 part by weight or less and especially preferably 0.8 parts by weight or less. In particular, by setting the amount of the ultraviolet ray screening agent to be 0.2 parts by weight or more relative to 100 parts by weight of the thermoplastic resin, with regard to the interlayer film and laminated glass, the lowering in visible light transmittance thereof after the lapse of a certain period of time can be significantly suppressed.

(Oxidation Inhibitor)

It is preferred that the interlayer film include an oxidation inhibitor. One kind of the oxidation inhibitor may be used alone, and two or more kinds thereof may be combinedly used.

Examples of the oxidation inhibitor include a phenol-based oxidation inhibitor, a sulfur-based oxidation inhibitor, a phosphorus-based oxidation inhibitor, and the like. The phenol-based oxidation inhibitor is an oxidation inhibitor having a phenol skeleton. The sulfur-based oxidation inhibitor is an oxidation inhibitor containing a sulfur atom. The phosphorus-based oxidation inhibitor is an oxidation inhibitor containing a phosphorus atom.

It is preferred that the oxidation inhibitor be a phenol-based oxidation inhibitor or a phosphorus-based oxidation inhibitor.

Examples of the phenol-based oxidation inhibitor include 2,6-di-t-butyl-p-cresol (BHT), butylated hydroxyanisole (BHA), 2,6-di-t-butyl-4-ethylphenol, stearyl-β-(3,5-di-t-butyl-4-hydroxyphenyl)propionate, 2,2'-methylenebis-(4-methyl-6-butylphenol), 2,2'-methylenebis-(4-ethyl-6-t-butylphenol), 4,4'-butylidene-bis-(3-methyl-6-t-butylphenol), 1,1,3-tris-(2-methyl-hydroxy-5-t-butylphenyl)butane, tetrakis[methylene-3-(3',5'-butyl-4-hydroxyphenyl)propionate] methane, 1,3,3-tris-(2-methyl-4-hydroxy-5-t-butylphenol)butane, 1,3,5-trimethyl-2,4,6-tris(3,5-di-t-butyl-4-hydroxybenzyl)benzene, bis(3,3'-t-butylphenol)butyric acid glycol ester, bis(3-t-butyl-4-hydroxy-5-methylbenzenepropanoic acid)ethylenebis(oxyethylene), and the like. One kind or two or more kinds among these oxidation inhibitors are suitably used.

Examples of the phosphorus-based oxidation inhibitor include tridecyl phosphite, tris(tridecyl) phosphite, triphenyl phosphite, trinonylphenyl phosphite, bis(tridecyl)pentaerithritol diphosphite, bis(decyl)pentaerithritol diphosphite, tris(2,4-di-t-butylphenyl)phosphite, bis(2,4-di-t-butyl-6-methylphenyl)ethyl ester phosphorous acid, tris(2,4-di-t-butylphenyl)phosphite, 2,2'-methylenebis(4,6-di-t-butyl-1-phenyloxy)(2-ethylhexyloxy)phosphorus, and the like. One kind or two or more kinds among these oxidation inhibitors are suitably used.

Examples of a commercial product of the oxidation inhibitor include "Sumilizer BHT" available from Sumitomo Chemical Co., Ltd., "IRGANOX 1010" available from Nihon Ciba-Geigy K.K., and the like.

With regard to the interlayer film and laminated glass, in order to maintain high visible light transmittance thereof over a long period of time, it is preferred that the amount of the oxidation inhibitor be 0.07% by weight or more in 100% by weight of the interlayer film. Moreover, in order to suppress the discoloration of the peripheral part due to the influence of the oxidation inhibitor, it is preferred that the amount of the oxidation inhibitor be 1.5% by weight or less, and it is more preferred that the amount thereof be 1.3% by weight or less, in 100% by weight of the interlayer film. Similarly, with regard to the interlayer film and laminated glass, in order to maintain high visible light transmittance thereof over a long period of time, it is preferred that the amount of the oxidation inhibitor relative to 100 parts by weight of the thermoplastic resin be 0.1 part by weight or more. Moreover, in order to suppress the discoloration of the peripheral part due to the influence of the oxidation inhibitor, it is preferred that the amount of the oxidation inhibitor relative to 100 parts by weight of the thermoplastic resin be 2 parts by weight or less and it is more preferred that the amount thereof be 1.8 parts by weight or less.

(Other Ingredients)

The interlayer film may include additives such as a light stabilizer, a flame retardant, an antistatic agent, a pigment, a dye, a moisture-resistance improving agent, an adhesive force regulating agent, a fluorescent brightening agent and an infrared ray absorber, as necessary. One kind of these additives may be used alone, and two or more kinds thereof may be combinedly used.

(Interlayer Film for Laminated Glass)

The thickness of the interlayer film is not particularly limited. From the viewpoint of the practical aspect and the viewpoint of sufficiently heightening the heat shielding properties, the thickness of the interlayer film is preferably 0.1 mm or more, more preferably 0.25 mm or more, preferably 3 mm or less and more preferably 1.5 mm or less. When the thickness of the interlayer film is the above lower limit or more, the penetration resistance of laminated glass is enhanced.

The production method of the interlayer film is not particularly limited. As the production method of the interlayer film, a conventionally known method can be used. Examples thereof include a production method of kneading a thermoplastic resin, the first compound, the second compound and other ingredients blended as necessary and forming the kneaded product into an interlayer film, and the like. A production method of extrusion-molding is preferred because the method is suitable for continuous production.

The method for kneading is not particularly limited. Examples of this method include a method using an extruder, a plastograph, a kneader, a banbury mixer, a calender roll, or the like. Of these, a method using an extruder is preferred and a method using a twin screw extruder is more preferred because the methods are suitable for continuous production.

(Laminated Glass)

FIG. 1 is a sectional view showing an example of laminated glass prepared with an interlayer film for laminated glass in accordance with one embodiment of the present invention.

Laminated glass 1 shown in FIG. 1 is provided with an interlayer film 2, a first laminated glass member 21 and a second laminated glass member 22. The interlayer film 2 is a single-layered interlayer film. The interlayer film 2 is used for obtaining laminated glass. The interlayer film 2 is an interlayer film for laminated glass.

The interlayer film 2 is arranged between the first laminated glass members 21 and the second laminated glass members 22 to be sandwiched. The first laminated glass member 21 is layered on a first surface 2a (one surface) of the interlayer film 2. The second laminated glass member 22 is layered on a second surface 2b (the other surface) opposite to the first surface 2a of the interlayer film 2.

FIG. 2 is a sectional view showing a modified example of laminated glass prepared with an interlayer film for laminated glass in accordance with one embodiment of the present invention.

Laminated glass 11 shown in FIG. 2 is provided with an interlayer film 12, a first laminated glass member 21 and a second laminated glass member 22. The interlayer film 12 is a multi-layered interlayer film. The interlayer film 12 is used for obtaining laminated glass. The interlayer film 12 is an interlayer film for laminated glass.

The interlayer film 12 has a structure in which three interlayer films of a first layer 13 (an interlayer film), a second layer 14 (an interlayer film) and a third layer 15 (an interlayer film) are layered in this order. In the present embodiment, the second layer 14 is a sound insulating layer. As the second layer 14, the interlayer film in accordance with one embodiment of the present invention is used. The first and third layers 13, 15 are protective layers. The first and third layers 13, 15 may also be interlayer films in accordance with the embodiment of the present invention.

The interlayer film 12 is arranged between the first laminated glass members 21 and the second laminated glass members 22 to be sandwiched. The second layer 14 (an interlayer film) is interposed between the first and third layers 13, 15 to be arranged between the first laminated glass member 21 and the second laminated glass member 22. The first laminated glass member 21 is layered on an outer surface 13a of the first layer 13. The second laminated glass member 22 is layered on an outer surface 15a of the third layer 15.

As described above, the laminated glass according to the present invention is provided with a first laminated glass member, a second laminated glass member and an interlayer film for laminated glass according to the present invention, and the interlayer film for laminated glass is arranged between the first laminated glass member and the second laminated glass member. The laminated glass may be provided with only the interlayer film for laminated glass according to the present invention, as the interlayer film, and may be provided with the interlayer film for laminated glass according to the present invention and another interlayer film for laminated glass. The laminated glass includes at least the interlayer film for laminated glass according to the present invention.

Examples of the laminated glass member include a glass plate, a PET (polyethylene terephthalate) film, and the like. As the laminated glass, laminated glass in which an interlayer film is sandwiched between a glass plate and a PET film or the like, as well as laminated glass in which an interlayer film is sandwiched between two glass plates, is included. Laminated glass is a laminate provided with a glass plate, and it is preferred that at least one glass plate be used. It is preferred that the first laminated glass member and the second laminated glass member be each a glass plate or a PET film and at least one among the first laminated glass member and the second laminated glass member be a glass plate.

Examples of the glass plate include a sheet of inorganic glass and a sheet of organic glass. Examples of the inorganic glass include float plate glass, heat ray-absorbing plate glass, heat ray-reflecting plate glass, polished plate glass, figured glass, net-reinforced plate glass, wired plate glass, and the like. The organic glass is synthetic resin glass substituted for inorganic glass. Examples of the organic glass include a polycarbonate plate, a poly(meth)acrylic resin plate, and the like. Examples of the poly(meth)acrylic resin plate include a polymethyl (meth)acrylate plate, and the like.

The thickness of the laminated glass member is preferably 1 mm or more, preferably 5 mm or less and more preferably 3 mm or less. Moreover, when the laminated glass member is a glass plate, the thickness of the glass plate is preferably 1 mm or more, preferably 5 mm or less and more preferably 3 mm or less. When the laminated glass member is a PET film, the thickness of the PET film is preferably 0.03 mm or more and preferably 0.5 mm or less.

The production method of the laminated glass is not particularly limited. For example, an interlayer film is sandwiched between the first laminated glass member and the second laminated glass member, and the air remaining between the first laminated glass member and the interlayer film and between the second laminated glass member and the interlayer film is removed by allowing the members to pass through a pressing roll or by putting the members into a rubber bag and sucking the contents under reduced pressure. Afterward, the members are preliminarily bonded together at about 70 to 110° C. to obtain a laminate. Next, by putting the laminate into an autoclave or by pressing the laminate, the members are press-bonded together at about 120 to 150° C. and under a pressure of 1 to 1.5 MPa. In this way, laminated glass can be obtained.

Each of the interlayer film and the laminated glass can be used for automobiles, railway vehicles, aircraft, ships, buildings and the like. Each of the interlayer film and the laminated glass can also be used for applications other than these applications. It is preferred that the interlayer film and the laminated glass be an interlayer film and laminated glass for vehicles or for building respectively, and it is more preferred that the interlayer film and the laminated glass be an interlayer film and laminated glass for vehicles respectively. Each of the interlayer film and the laminated glass can be used for a windshield, side glass, rear glass or roof glass of an automobile, and the like.

Hereinafter, the present invention will be described in more detail with reference to examples. The present invention is not limited only to these examples.

The following materials were used in examples and comparative examples.

Thermoplastic Resin:
PVB1 (a polyvinyl butyral resin acetalized with n-butyraldehyde, the average polymerization degree of 1700, the content of the hydroxyl group of 30.8% by mole, the acetylation degree of 0.7% by mole, the butyralization degree of 68.5% by mole)

In this connection, the content of the hydroxyl group, the acetylation degree and the butyralization degree (the acetalization degree) of the above-mentioned polyvinyl butyral were measured by a method in accordance with ASTM D1396-92. In this connection, even in the cases of being measured according to JIS K6728 "Testing methods for polyvinyl butyral", numerical values similar to those obtained by a method in accordance with ASTM D1396-92 were exhibited.

Plasticizer:
3GO (triethylene glycol di-2-ethylhexanoate)

First Compound:
Paliotol Yellow K 0961 (a quinophthalone compound, "Paliotol Yellow K 0961" available from BASF Japan Ltd., the maximum absorption wavelength of 425 nm)
RED SG-100 (a perylene compound, "RED SG-100" available from SUMIKA COLOR CO., LTD., the maximum absorption wavelength of 475 nm)

Second Compound:
SG-5A1257 (a copper phthalocyanine compound, "BLUE SG-5A1257" available from SUMIKA COLOR CO., LTD., the maximum absorption wavelength of 715 nm)
TAP CTB (a tetraazaporphyrin compound, "TAP CTB" available from YAMADA CHEMICAL CO., LTD., the maximum absorption wavelength of 585 nm)

(Another Compound Other than Second Compound)
FF-IRSORB 203 (a naphthalocyanine compound, "FF-IRSORB 203" available from FUJIFILM Corporation, the maximum absorption wavelength of 842 nm)

Ultraviolet Ray Screening Agent:
Tinuvin 326 (2-(2'-hydroxy-3'-t-butyl-5-methylphenyl)-5-chlorobenzotriazole, "Tinuvin 326" available from BASF Japan Ltd.)

Oxidation Inhibitor:
H-BHT (2,6-di-t-butyl-4-methylphenol, "H-BHT" available from Sakai Chemical Industry Co., Ltd.)

Example 1

Preparation of Interlayer Film:
To 100 parts by weight of a polyvinyl butyral resin (PVB1), 40 parts by weight of triethylene glycol di-2-ethylhexanoate (3GO), Paliotol Yellow K 0961 (a quinophthalone compound, "Paliotol Yellow K 0961" available from BASF Japan Ltd., the maximum absorption wavelength of 425 nm) in an amount that the content thereof in the resulting interlayer film becomes 0.003% by weight, SG-5A1257 (a copper phthalocyanine-based compound, "BLUE SG-5A1257" available from SUMIKA COLOR CO., LTD.) in an amount that the content thereof in the resulting interlayer film becomes 0.0010% by weight, 0.2 parts by weight of Tinuvin 326 (2-(2'-hydroxy-3'-t-butyl-5-methylphenyl)-5-chlorobenzotriazole, "Tinuvin 326" available from BASF Japan Ltd.) and 0.2 parts by weight of H-BHT (2,6-di-t-butyl-4-methylphenol, "H-BHT" available from Sakai Chemical Industry Co., Ltd.) were added and thoroughly kneaded with a mixing roll to obtain a composition.

The composition obtained was extruded by an extruder to obtain a single-layered interlayer film (0.76 mm in thickness).

Preparation of Laminated Glass:
The interlayer film obtained (0.76 mm in thickness) was arranged between two sheets of transparent float plate glass (2.5 mm in thickness) and fixed by means of a heat resistant tape so as not to positionally shift to obtain a laminate.

The laminate obtained was installed in a vacuum bag, and the inside of the vacuum bag was degassed at a degree of vacuum of 933.2 hPa and at ordinary temperature (23° C.) Subsequently, the temperature in the vacuum bag was elevated to 100° C. while maintaining the degassed state, and after the temperature reached 100° C., the laminate was held for 20 minutes. Afterward, the vacuum bag was spontaneously cooled, and it was confirmed that the temperature was lowered to 30° C., after which the pressure was released to the atmosphere.

The laminated glass preliminarily press-bonded by the above-mentioned vacuum bag method was press-bonded for 20 minutes under conditions of 135° C. and a pressure of 1.2 MPa using an autoclave to obtain a sheet of laminated glass.

In this connection, in order to perform evaluation tests shown below, a sheet of laminated glass with a size of 300 mm×300 mm and a sheet of laminated glass with a size of 50 mm×50 mm were prepared.

Examples 2 to 36 and Comparative Examples 1 to 30

A single-layered interlayer film was prepared in the same manner as that in Example 1 except that the kind of ingredients to be blended and the content thereof were set to those listed in the following Tables 1, 2 and 3. Using the interlayer film obtained, a sheet of laminated glass provided with the interlayer film was prepared in the same manner as that in Example 1.

(Evaluation)
(1) Measurement Method of Maximum Absorption Wavelength

With 100 parts by weight of chloroform, 0.002 parts by weight of a first compound, a second compound or another compound other than the second compound was mixed to obtain a chloroform solution. The chloroform solution obtained was placed in a quartz cell for a spectrophotometer with an optical path length of 1.0 mm. Using a self-registering spectrophotometer ("U4100" available from Hitachi, Ltd.), the transmittance at 300 to 2500 nm was measured to determine the maximum absorption wavelength. The measured values are described in the column of the above-mentioned materials.

(2) Transmittance for Light Ray with Wavelength of 430 nm

Using a self-registering spectrophotometer ("U4100" available from Hitachi, Ltd.), the sheet of laminated glass with a size of 50 mm×50 mm was measured for the transmittance in the wavelength range of 300 to 2500 nm. The transmittance for a light ray with a wavelength of 430 nm was calculated in accordance with JIS R3211 (1998).

(3) Excitation Purity

Using a spectrophotometer ("U4100" available from Hitachi, Ltd.), the sheet of laminated glass was measured for the transmittance at 300 to 2500 nm. The excitation purity in the C light XYZ colorimetric system was calculated in accordance with JIS Z8701 (1999).

The results are shown in the following Tables 1, 2 and 3.

In the following Tables 1, 2 and 3, the part by weight as a blending amount refers to the blending amount relative to 100 parts by weight of the thermoplastic resin, and the wt % as a blending amount refers to the blending amount in 100% by weight of the interlayer film.

TABLE 1

| | | Composition of interlayer film | | | | | | | |
|---|---|---|---|---|---|---|---|---|---|
| | | Thermoplastic resin | | Plasticizer | | Ultraviolet ray screening agent | | Oxidation inhibitor | |
| | | Kind | Blending amount Parts by weight | Kind | Blending amount Parts by weight | Kind | Blending amount Parts by weight | Kind | Blending amount Parts by weight |
| Series 1: Blending amount of first compound of 0.0030 wt % | | | | | | | | | |
| Comp. Ex. | 1 | PVB1 | 100 | 3GO | 40 | Tinuvin326 | 0.2 | H-BHT | 0.2 |
| Ex. | 1 | PVB1 | 100 | 3GO | 40 | Tinuvin326 | 0.2 | H-BHT | 0.2 |
| Ex. | 2 | PVB1 | 100 | 3GO | 40 | Tinuvin326 | 0.2 | H-BHT | 0.2 |
| Ex. | 3 | PVB1 | 100 | 3GO | 40 | Tinuvin326 | 0.2 | H-BHT | 0.2 |
| Comp. Ex. | 2 | PVB1 | 100 | 3GO | 40 | Tinuvin326 | 0.2 | H-BHT | 0.2 |
| Series 2: Blending amount of first compound of 0.0150 wt % | | | | | | | | | |
| Comp. Ex. | 3 | PVB1 | 100 | 3GO | 40 | Tinuvin326 | 0.2 | H-BHT | 0.2 |
| Ex. | 4 | PVB1 | 100 | 3GO | 40 | Tinuvin326 | 0.2 | H-BHT | 0.2 |
| Ex. | 5 | PVB1 | 100 | 3GO | 40 | Tinuvin326 | 0.2 | H-BHT | 0.2 |
| Ex. | 6 | PVB1 | 100 | 3GO | 40 | Tinuvin326 | 0.2 | H-BHT | 0.2 |
| Ex. | 7 | PVB1 | 100 | 3GO | 40 | Tinuvin326 | 0.2 | H-BHT | 0.2 |
| Comp. Ex. | 4 | PVB1 | 100 | 3GO | 40 | Tinuvin326 | 0.2 | H-BHT | 0.2 |
| Series 3: Blending amount of first compound of 0.0250 wt % | | | | | | | | | |
| Comp. Ex. | 5 | PVB1 | 100 | 3GO | 40 | Tinuvin326 | 0.2 | H-BHT | 0.2 |
| Ex. | 8 | PVB1 | 100 | 3GO | 40 | Tinuvin326 | 0.2 | H-BHT | 0.2 |
| Ex. | 9 | PVB1 | 100 | 3GO | 40 | Tinuvin326 | 0.2 | H-BHT | 0.2 |
| Ex. | 10 | PVB1 | 100 | 3GO | 40 | Tinuvin326 | 0.2 | H'-BHT | 0.2 |
| Ex. | 11 | PVB1 | 100 | 3GO | 40 | Tinuvin326 | 0.2 | H-BHT | 0.2 |
| Comp. Ex. | 6 | PVB1 | 100 | 3GO | 40 | Tinuvin326 | 0.2 | H-BHT | 0.2 |
| Series 4: Blending amount of first compound of 0.0500 wt % | | | | | | | | | |
| Comp. Ex. | 7 | PVB1 | 100 | 3GO | 40 | Tinuvin326 | 0.2 | H-BHT | 0.2 |
| Ex. | 12 | PVB1 | 100 | 3GO | 40 | Tinuvin326 | 0.2 | H-BHT | 0.2 |
| Ex. | 13 | PVB1 | 100 | 3GO | 40 | Tinuvin326 | 0.2 | H-BHT | 0.2 |
| Ex. | 14 | PVB1 | 100 | 3GO | 40 | Tinuvin326 | 0.2 | H-BHT | 0.2 |
| Comp. Ex. | 8 | PVB1 | 100 | 3GO | 40 | Tinuvin326 | 0.2 | H-BHT | 0.2 |

TABLE 1-continued

| | | | | | | | | |
|---|---|---|---|---|---|---|---|---|
| \multicolumn{9}{c}{Series 5: Blending amount of first compound of 0.0250 wt %} |
| Comp. Ex. | 9 | PVB1 | 100 | 3GO | 40 | Tinuvin326 | 0.2 | H-BHT | 0.2 |
| Ex. | 15 | PVB1 | 100 | 3GO | 40 | Tinuvin326 | 0.2 | H-BHT | 0.2 |
| Ex. | 16 | PVB1 | 100 | 3GO | 40 | Tinuvin326 | 0.2 | H-BHT | 0.2 |
| Ex. | 17 | PVB1 | 100 | 3GO | 40 | Tinuvin326 | 0.2 | H-BHT | 0.2 |
| Comp. Ex. | 10 | PVB1 | 100 | 3GO | 40 | Tinuvin326 | 0.2 | H-BHT | 0.2 |

| | | Composition of interlayer film | | | | Total amount of | Evaluation | |
|---|---|---|---|---|---|---|---|---|
| | | First compound | | Second compound | | Blending ratio | first compound and | Transmittance for light ray with | Excitation |
| | | Kind | Blending amount wt % | Kind | Blending amount wt % | (First compound/ Second compound) | second compound (wt %) | wavelength of 430 nm (%) | purity |
| \multicolumn{10}{c}{Series 1: Blending amount of first compound of 0.0030 wt %} |
| Comp. Ex. | 1 | Paliotol Yellow K 0961 | 0.0030 | — | — | — | — | 76 | 5.9 |
| Ex. | 1 | Paliotol Yellow K 0961 | 0.0030 | SG-5A1257 | 0.0010 | 3.0 | 0.0040 | 75 | 3.2 |
| Ex. | 2 | Paliotol Yellow K 0961 | 0.0030 | SG-5A1257 | 0.0020 | 1.5 | 0.0050 | 75 | 2.8 |
| Ex. | 3 | Paliotol Yellow K 0961 | 0.0030 | SG-5A1257 | 0.0030 | 1.0 | 0.0060 | 74 | 5.7 |
| Comp. Ex. | 2 | Paliotol Yellow K 0961 | 0.0030 | SG-5A1257 | 0.0075 | 0.4 | 0.0105 | 71 | 18.2 |
| \multicolumn{10}{c}{Series 2: Blending amount of first compound of 0.0150 wt %} |
| Comp. Ex. | 3 | Paliotol Yellow K 0961 | 0.0150 | — | — | — | — | 43 | 25.2 |
| Ex. | 4 | Paliotol Yellow K 0961 | 0.0150 | SG-5A1257 | 0.0010 | 15.0 | 0.0160 | 42 | 22.7 |
| Ex. | 5 | Paliotol Yellow K 0961 | 0.0150 | SG-5A1257 | 0.0050 | 3.0 | 0.0200 | 41 | 13.0 |
| Ex. | 6 | Paliotol Yellow K 0961 | 0.0150 | SG-5A1257 | 0.0100 | 1.5 | 0.0250 | 39 | 13.2 |
| Ex. | 7 | Paliotol Yellow K 0961 | 0.0150 | SG-5A1257 | 0.0150 | 1.0 | 0.0300 | 37 | 24.9 |
| Comp. Ex. | 4 | Paliotol Yellow K 0961 | 0.0150 | SG-5A1257 | 0.0375 | 0.4 | 0.0525 | 31 | 54.9 |
| \multicolumn{10}{c}{Series 3: Blending amount of first compound of 0.0250 wt %} |
| Comp. Ex. | 5 | Paliotol Yellow K 0961 | 0.0250 | — | — | — | — | 26 | 39.4 |
| Ex. | 8 | Paliotol Yellow K 0961 | 0.0250 | SG-5A1257 | 0.0010 | 25.0 | 0.0260 | 26 | 37.1 |
| Ex. | 9 | Paliotol Yellow K 0961 | 0.0250 | SG-5A1257 | 0.0050 | 5.0 | 0.0300 | 25 | 27.2 |
| Ex. | 10 | Paliotol Yellow K 0961 | 0.0250 | SG-5A1257 | 0.0200 | 1.3 | 0.0450 | 22 | 28.1 |
| Ex. | 11 | Paliotol Yellow K 0961 | 0.0250 | SG-5A1257 | 0.0250 | 1.0 | 0.0500 | 21 | 35.9 |
| Comp. Ex. | 6 | Paliotol Yellow K 0961 | 0.0250 | SG-5A1257 | 0.0625 | 0.4 | 0.0875 | 15 | 62.8 |
| \multicolumn{10}{c}{Series 4: Blending amount of first compound of 0.0500 wt %} |
| Comp. Ex. | 7 | Paliotol Yellow K 0961 | 0.0500 | — | — | — | — | 8 | 63.4 |
| Ex. | 12 | Paliotol Yellow K 0961 | 0.0500 | SG-5A1257 | 0.0010 | 50.0 | 0.0510 | 8 | 60.7 |
| Ex. | 13 | Paliotol Yellow K 0961 | 0.0500 | SG-5A1257 | 0.0050 | 10.0 | 0.0550 | 8 | 54.5 |
| Ex. | 14 | Paliotol Yellow K 0961 | 0.0500 | SG-5A1257 | 0.0500 | 1.0 | 0.1000 | 5 | 51.9 |
| Comp. Ex. | 8 | Paliotol Yellow K 0961 | 0.0500 | SG-5A1257 | 0.1250 | 0.4 | 0.1750 | 3 | 71.0 |
| \multicolumn{10}{c}{Series 5: Blending amount of first compound of 0.0250 wt %} |
| Comp. Ex. | 9 | Paliotol Yellow K 0961 | 0.0250 | — | — | — | — | 26 | 39.4 |
| Ex. | 15 | Paliotol Yellow K 0961 | 0.0250 | TAP CTB | 0.0010 | 25.0 | 0.0260 | 26 | 35.7 |
| Ex. | 16 | Paliotol Yellow K 0961 | 0.0250 | TAP CTB | 0.0100 | 2.5 | 0.0350 | 25 | 14.9 |

TABLE 1-continued

| | | | | | | | | | |
|---|---|---|---|---|---|---|---|---|---|
| Ex. | 17 | Paliotol Yellow K 0961 | 0.0250 | TAP CTB | 0.0500 | 0.5 | 0.0750 | 22 | 32.3 |
| Comp. Ex. | 10 | Paliotol Yellow K 0961 | 0.0250 | TAP CTB | 0.1000 | 0.3 | 0.1250 | 18 | 51.6 |

TABLE 2

| | | Composition of interlayer film | | | | | | | |
|---|---|---|---|---|---|---|---|---|---|
| | | Thermoplastic resin | | Plasticizer | | Ultraviolet ray screening agent | | Oxidation inhibitor | |
| | | Kind | Blending amount Parts by weight | Kind | Blending amount Parts by weight | Kind | Blending amount Parts by weight | Kind | Blending amount Parts by weight |
| Series 6: Total blending amount of first compound and second compound of 0.0400 wt % | | | | | | | | | |
| Comp. Ex. | 11 | PVB1 | 100 | 3GO | 40 | Tinuvin326 | 0.2 | H-BHT | 0.2 |
| Ex. | 18 | PVB1 | 100 | 3GO | 40 | Tinuvin326 | 0.2 | H-BHT | 0.2 |
| Ex. | 19 | PVB1 | 100 | 3GO | 40 | Tinuvin326 | 0.2 | H-BHT | 0.2 |
| Ex. | 20 | PVB1 | 100 | 3GO | 40 | Tinuvin326 | 0.2 | H-BHT | 0.2 |
| Comp. Ex. | 12 | PVB1 | 100 | 3GO | 40 | Tinuvin326 | 0.2 | H-BHT | 0.2 |
| Series 7: Total blending amount of first compound and second compound of 0.0300 wt % | | | | | | | | | |
| Comp. Ex. | 13 | PVB1 | 100 | 3GO | 40 | Tinuvin326 | 0.2 | H-BHT | 0.2 |
| Ex. | 21 | PVB1 | 100 | 3GO | 40 | Tinuvin326 | 0.2 | H-BHT | 0.2 |
| Ex. | 22 | PVB1 | 100 | 3GO | 40 | Tinuvin326 | 0.2 | H-BHT | 0.2 |
| Ex. | 23 | PVB1 | 100 | 3GO | 40 | Tinuvin326 | 0.2 | H-BHT | 0.2 |
| Comp. Ex. | 14 | PVB1 | 100 | 3GO | 40 | Tinuvin326 | 0.2 | H-BHT | 0.2 |
| Series 8: Total blending amount of first compound and second compound of 0.00200 wt % | | | | | | | | | |
| Comp. Ex. | 15 | PVB1 | 100 | 3GO | 40 | Tinuvin326 | 0.2 | H-BHT | 0.2 |
| Ex. | 24 | PVB1 | 100 | 3GO | 40 | Tinuvin326 | 0.2 | H-BHT | 0.2 |
| Ex. | 25 | PVB1 | 100 | 3GO | 40 | Tinuvin326 | 0.2 | H-BHT | 0.2 |
| Ex. | 26 | PVB1 | 100 | 3GO | 40 | Tinuvin326 | 0.2 | H-BHT | 0.2 |
| Ex. | 27 | PVB1 | 100 | 3GO | 40 | Tinuvin326 | 0.2 | H-BHT | 0.2 |
| Ex. | 28 | PVB1 | 100 | 3GO | 40 | Tinuvin326 | 0.2 | H-BHT | 0.2 |
| Comp. Ex. | 16 | PVB1 | 100 | 3GO | 40 | Tinuvin326 | 0.2 | H-BHT | 0.2 |
| Series 9: Total blending amount of first compound and second compound of 0.0100 wt % | | | | | | | | | |
| Comp. Ex. | 17 | PVB1 | 100 | 3GO | 40 | Tinuvin326 | 0.2 | H-BHT | 0.2 |
| Ex. | 29 | PVB1 | 100 | 3GO | 40 | Tinuvin326 | 0.2 | H-BHT | 0.2 |
| Ex. | 30 | PVB1 | 100 | 3GO | 40 | Tinuvin326 | 0.2 | H-BHT | 0.2 |
| Comp. Ex. | 18 | PVB1 | 100 | 3GO | 40 | Tinuvin326 | 0.2 | H-BHT | 0.2 |

| | | Composition of interlayer film | | | | | Evaluation | |
|---|---|---|---|---|---|---|---|---|
| | | First compound | | Second compound | | Blending ratio | Total amount of first compound and second compound (wt %) | Transmittance for light ray with wavelength of 430 nm (%) | Excitation purity |
| | | Kind | Blending amount wt % | Kind | Blending amount wt % | (First compound/ Second compound) | | | |
| Series 6: Total blending amount of first compound and second compound of 0.0400 wt % | | | | | | | | | |
| Comp. Ex. | 11 | Paliotol Yellow K 0961 | 0.0400 | — | — | — | — | 13 | 54.4 |
| Ex. | 18 | Paliotol Yellow K 0961 | 0.0333 | SG-5A1257 | 0.0067 | 5.0 | 0.0400 | 17 | 34.3 |
| Ex. | 19 | Paliotol Yellow K 0961 | 0.0222 | SG-5A1257 | 0.0178 | 1.3 | 0.0400 | 26 | 25.6 |
| Ex. | 20 | Paliotol Yellow K 0961 | 0.0200 | SG-5A1257 | 0.0200 | 1.0 | 0.0400 | 28 | 30.9 |
| Comp. Ex. | 12 | Paliotol Yellow K 0961 | 0.0114 | SG-5A1257 | 0.0286 | 0.4 | 0.0400 | 39 | 48.4 |
| Series 7: Total blending amount of first compound and second compound of 0.0300 wt % | | | | | | | | | |
| Comp. Ex. | 13 | Paliotol Yellow K 0961 | 0.0300 | — | — | — | — | 21 | 45.1 |
| Ex. | 21 | Paliotol Yellow K 0961 | 0.0250 | SG-5A1257 | 0.0050 | 5.0 | 0.0300 | 25 | 27.2 |
| Ex. | 22 | Paliotol Yellow K 0961 | 0.0167 | SG-5A1257 | 0.0133 | 1.3 | 0.0300 | 35 | 20.1 |

TABLE 2-continued

| | | | | | | | | | |
|---|---|---|---|---|---|---|---|---|---|
| Ex. | 23 | Paliotol Yellow K 0961 | 0.0150 | SG-5A1257 | 0.0150 | 1.0 | 0.0300 | 37 | 24.9 |
| Comp. Ex. | 14 | Paliotol Yellow K 0961 | 0.0086 | SG-5A1257 | 0.0214 | 0.4 | 0.0300 | 48 | 41.1 |
| Series 8: Total blending amount of first compound and second compound of 0.00200 wt % | | | | | | | | | |
| Comp. Ex. | 15 | Paliotol Yellow K 0961 | 0.0200 | — | — | — | — | 34 | 32.1 |
| Ex. | 24 | Paliotol Yellow K 0961 | 0.0196 | SG-5A1257 | 0.0004 | 50.0 | 0.0200 | 34 | 31.4 |
| Ex. | 25 | Paliotol Yellow K 0961 | 0.0192 | SG-5A1257 | 0.0008 | 25.0 | 0.0200 | 35 | 29.9 |
| Ex. | 26 | Paliotol Yellow K 0961 | 0.0167 | SG-5A1257 | 0.0033 | 5.0 | 0.0200 | 38 | 19.2 |
| Ex. | 27 | Paliotol Yellow K 0961 | 0.0111 | SG-5A1257 | 0.0089 | 1.3 | 0.0200 | 48 | 14.1 |
| Ex. | 28 | Paliotol Yellow K 0961 | 0.0100 | SG-5A1257 | 0.0100 | 1.0 | 0.0200 | 50 | 17.6 |
| Comp. Ex. | 16 | Paliotol Yellow K 0961 | 0.0057 | SG-5A1257 | 0.0143 | 0.4 | 0.0200 | 59 | 31.5 |
| Series 9: Total blending amount of first compound and second compound of 0.0100 wt % | | | | | | | | | |
| Comp. Ex. | 17 | Paliotol Yellow K 0961 | 0.0100 | — | — | — | — | 54 | 17.7 |
| Ex. | 29 | Paliotol Yellow K 0961 | 0.0098 | SG-5A1257 | 0.00020 | 50.0 | 0.0100 | 55 | 16.8 |
| Ex. | 30 | Paliotol Yellow K 0961 | 0.0096 | SG-5A1257 | 0.00038 | 25.0 | 0.0100 | 55 | 15.9 |
| Comp. Ex. | 18 | Paliotol Yellow K 0961 | 0.0029 | SG-5A1257 | 0.00714 | 0.4 | 0.0100 | 72 | 17.4 |

TABLE 3

| | | Composition of interlayer film | | | | | | | |
|---|---|---|---|---|---|---|---|---|---|
| | | Thermoplastic resin | | Plasticizer | | Ultraviolet ray screening agent | | Oxidation inhibitor | |
| | | Kind | Blending amount Parts by weight | Kind | Blending amount Parts by weight | Kind | Blending amount Parts by weight | Kind | Blending amount Parts by weight |
| Series 10: Total blending amount of first compound and second compound of 0.0400 wt % | | | | | | | | | |
| Comp. Ex. | 19 | PVB1 | 100 | 3GO | 40 | Tinuvin326 | 0.2 | H-BHT | 0.2 |
| Ex. | 31 | PVB1 | 100 | 3GO | 40 | Tinuvin326 | 0.2 | H-BHT | 0.2 |
| Ex. | 32 | PVB1 | 100 | 3GO | 40 | Tinuvin326 | 0.2 | H-BHT | 0.2 |
| Ex. | 33 | PVB1 | 100 | 3GO | 40 | Tinuvin326 | 0.2 | H-BHT | 0.2 |
| Comp. Ex. | 20 | PVB1 | 100 | 3GO | 40 | Tinuvin326 | 0.2 | H-BHT | 0.2 |
| Series 11: Total blending amount of first compound and second compound of 0.0200 wt % | | | | | | | | | |
| Comp. Ex. | 21 | PVB1 | 100 | 3GO | 40 | Tinuvin326 | 0.2 | H-BHT | 0.2 |
| Ex. | 34 | PVB1 | 100 | 3GO | 40 | Tinuvin326 | 0.2 | H-BHT | 0.2 |
| Ex. | 35 | PVB1 | 100 | 3GO | 40 | Tinuvin326 | 0.2 | H-BHT | 0.2 |
| Ex. | 36 | PVB1 | 100 | 3GO | 40 | Tinuvin326 | 0.2 | H-BHT | 0.2 |
| Comp. Ex. | 22 | PVB1 | 100 | 3GO | 40 | Tinuvin326 | 0.2 | H-BHT | 0.2 |
| Series 12: Total blending amount of first compound and FF-IRSORB 203 of 0.0400 wt % | | | | | | | | | |
| Comp. Ex. | 23 | PVB1 | 100 | 3GO | 40 | Tinuvin326 | 0.2 | H-BHT | 0.2 |
| Comp. Ex. | 24 | PVB1 | 100 | 3GO | 40 | Tinuvin326 | 0.2 | H-BHT | 0.2 |
| Comp. Ex. | 25 | PVB1 | 100 | 3GO | 40 | Tinuvin326 | 0.2 | H-BHT | 0.2 |
| Comp. Ex. | 26 | PVB1 | 100 | 3GO | 40 | Tinuvin326 | 0.2 | H-BHT | 0.2 |
| Series 13: Total blending amount of first compound and FF-IRSORB 203 of 0.0200 wt % | | | | | | | | | |
| Comp. Ex. | 27 | PVB1 | 100 | 3GO | 40 | Tinuvin326 | 0.2 | H-BHT | 0.2 |
| Comp. Ex. | 28 | PVB1 | 100 | 3GO | 40 | Tinuvin326 | 0.2 | H-BHT | 0.2 |
| Comp. Ex. | 29 | PVB1 | 100 | 3GO | 40 | Tinuvin326 | 0.2 | H-BHT | 0.2 |
| Comp. Ex. | 30 | PVB1 | 100 | 3GO | 40 | Tinuvin326 | 0.2 | H-BHT | 0.2 |

TABLE 3-continued

| | | Composition of interlayer film | | | Blending ratio (First compound/ Second compound or another compound) | Total amount of first compound and second compound or another compound (wt %) | Evaluation | |
|---|---|---|---|---|---|---|---|---|
| | | First compound | | Second compound or another compound | | | | Transmittance for light ray with wavelength of 430 nm (%) | Excitation purity |
| | | Kind | Blending amount wt % | Kind | Blending amount wt % | | | | |
| Series 10: Total blending amount of first compound and second compound of 0.0400 wt % | | | | | | | | | |
| Comp. Ex. | 19 | RED SG-100 | 0.0400 | — | — | — | — | 27 | 58.7 |
| Ex. | 31 | RED SG-100 | 0.0333 | SG-5A1257 | 0.0067 | 5.0 | 0.0400 | 31 | 31.4 |
| Ex. | 32 | RED SG-100 | 0.0285 | SG-5A1257 | 0.0115 | 2.5 | 0.0400 | 35 | 10.5 |
| Ex. | 33 | RED SG-100 | 0.0200 | SG-5A1257 | 0.0200 | 1.0 | 0.0400 | 41 | 24.2 |
| Comp. Ex. | 20 | RED SG-100 | 0.0114 | SG-5A1257 | 0.0286 | 0.4 | 0.0400 | 49 | 48.1 |
| Series 11: Total blending amount of first compound and second compound of 0.0200 wt % | | | | | | | | | |
| Comp. Ex. | 21 | RED SG-100 | 0.0200 | — | — | — | — | 49 | 33.0 |
| Ex. | 34 | RED SG-100 | 0.0167 | SG-5A1257 | 0.0033 | 5.0 | 0.0200 | 52 | 17.4 |
| Ex. | 35 | RED SG-100 | 0.0143 | SG-5A1257 | 0.0057 | 2.5 | 0.0200 | 55 | 6.4 |
| Ex. | 36 | RED SG-100 | 0.0100 | SG-5A1257 | 0.0100 | 1.0 | 0.0200 | 60 | 12.4 |
| Comp. Ex. | 22 | RED SG-100 | 0.0057 | SG-5A1257 | 0.0143 | 0.4 | 0.0200 | 65 | 29.7 |
| Series 12: Total blending amount of first compound and FF-IRSORB 203 of 0.0400 wt % | | | | | | | | | |
| Comp. Ex. | 23 | Paliotol Yellow K 0961 | 0.0333 | FF-IRSORB 203 | 0.0067 | 5.0 | 0.0400 | 15 | 54.6 |
| Comp. Ex. | 24 | Paliotol Yellow K 0961 | 0.0285 | FF-IRSORB 203 | 0.0115 | 2.5 | 0.0400 | 17 | 53.3 |
| Comp. Ex. | 25 | Paliotol Yellow K 0961 | 0.0200 | FF-IRSORB 203 | 0.0200 | 1.0 | 0.0400 | 20 | 52.4 |
| Comp. Ex. | 26 | Paliotol Yellow K 0961 | 0.0114 | FF-IRSORB 203 | 0.0286 | 0.4 | 0.0400 | 25 | 49.2 |
| Series 13: Total blending amount of first compound and FF-IRSORB 203 of 0.0200 wt % | | | | | | | | | |
| Comp. Ex. | 27 | Paliotol Yellow K 0961 | 0.0167 | FF-IRSORB 203 | 0.0033 | 5.0 | 0.0200 | 36 | 31.6 |
| Comp. Ex. | 28 | Paliotol Yellow K 0961 | 0.0143 | FF-IRSORB 203 | 0.0057 | 2.5 | 0.0200 | 38 | 30.6 |
| Comp. Ex. | 29 | Paliotol Yellow K 0961 | 0.0100 | FF-IRSORB 203 | 0.0100 | 1.0 | 0.0200 | 42 | 29.5 |
| Comp. Ex. | 30 | Paliotol Yellow K 0961 | 0.0057 | FF-IRSORB 203 | 0.0143 | 0.4 | 0.0200 | 47 | 27.3 |

EXPLANATION OF SYMBOLS

1: Laminated glass
2: Interlayer film
2a: First surface
2b: Second surface
11: Laminated glass
12: Interlayer film
13: First layer (interlayer film)
14: Second layer (interlayer film)
15: Third layer (interlayer film)
13a: Outer surface
15a: Outer surface
21: First laminated glass member
22: Second laminated glass member

The invention claimed is:

1. An interlayer film for laminated glass, comprising a thermoplastic resin having at least one first compound selected from yellow color-based coloring matter and red color-based coloring matter and at least one second compound selected from blue color-based coloring matter and purple color-based coloring matter,
the ratio of the amount of the first compound to the amount of the second compound being 0.5 or more,
the first compound being constituted of at least one kind selected from the group consisting of a quinophthalone compound with a maximum absorption wavelength of 300 nm or more and 550 nm or less, a perylene compound with a maximum absorption wavelength of 300 nm or more and 550 nm or less and an isoindolinone compound with a maximum absorption wavelength of 300 nm or more and 550 nm or less, and
the second compound being constituted of at least one kind selected from the group consisting of phthalocyanine compound with a maximum absorption wavelength of 550 nm or more and 750 nm or less, a naphthalocyanine compound with a maximum absorption wavelength of 550 nm or more and 750 nm or less and a tetraazaporphyrin compound with a maximum absorption wavelength of 550 nm or more and 750 nm or less,
wherein the maximum absorption wavelength of a matter or a compound is a wavelength at which transmittance of said matter or compound in a wavelength range of 300 to 2500 nm shows a minimum value.

2. The interlayer film for laminated glass according to claim 1, wherein the thermoplastic resin is a polyvinyl acetal resin.

3. The interlayer film for laminated glass according to claim 1, further comprising a plasticizer.

4. The interlayer film for laminated glass according to claim 1, wherein the ratio of the amount of the first compound to the amount of the second compound is 1.0 or more.

5. The interlayer film for laminated glass according to claim 1, wherein the ratio of the amount of the first compound to the amount of the second compound is 5.0 or less.

6. The interlayer film for laminated glass according to claim 1, further comprising an ultraviolet ray screening agent.

7. The interlayer film for laminated glass according to claim 1, further comprising an oxidation inhibitor.

8. Laminated glass, comprising a first laminated glass member, a second laminated glass member and an interlayer film for laminated glass according to claim 1,
the interlayer film for laminated glass being arranged between the first laminated glass member and the second laminated glass member.

9. The interlayer film for laminated glass according to claim 1,
the second compound is constituted of at least one kind selected from the group consisting of a phthalocyanine compound with a maximum absorption wavelength of 550 nm or more and 750 nm or less and a tetraazaporphyrin compound with a maximum absorption wavelength of 550 nm or more and 750 nm or less.

10. The interlayer film for laminated glass according to claim 1,
the second compound is a tetraazaporphyrin compound with a maximum absorption wavelength of 550 nm or more and 750 nm or less.

11. The interlayer film for laminated glass according to claim 1,
the first compound is the red color-based coloring matter.

12. The interlayer film for laminated glass according to claim 11,
the red color-based coloring matter is a perylene compound.

13. The interlayer film for laminated glass according to claim 1,
the first compound is an isoindolinone compound with a maximum absorption wavelength of 300 nm or more and 550 nm or less.

* * * * *